(12) United States Patent
Miles et al.

(10) Patent No.: US 11,201,360 B2
(45) Date of Patent: Dec. 14, 2021

(54) RECHARGEABLE POWER CELLS

(71) Applicant: DST Innovations Limited, Bridgend (GB)

(72) Inventors: Anthony Miles, Bridgend (GB); Niladri Vyas, Bridgend (GB)

(73) Assignee: DST Innovations Limited, Bridgend (GB)

(*) Notice: Subject to any disclaimer, the term of this patent is extended or adjusted under 35 U.S.C. 154(b) by 209 days.

(21) Appl. No.: 15/684,170

(22) Filed: Aug. 23, 2017

(65) Prior Publication Data

US 2018/0062219 A1 Mar. 1, 2018

(30) Foreign Application Priority Data

Aug. 24, 2016 (GB) ..................... 1614447

(51) Int. Cl.
*H01M 10/46* (2006.01)
*H01M 4/04* (2006.01)
(Continued)

(52) U.S. Cl.
CPC ............ *H01M 10/46* (2013.01); *H01G 11/08* (2013.01); *H01G 11/86* (2013.01); *H01M 4/0404* (2013.01); *H01M 4/0414* (2013.01); *H01M 10/0436* (2013.01); *H01M 10/4264* (2013.01); *H01M 16/00* (2013.01); *H02J 7/345* (2013.01); *H01G 11/10* (2013.01); *H01G 11/36* (2013.01); *H01G 11/46* (2013.01); *H01M 4/38* (2013.01); *H01M 4/50* (2013.01); *H01M 6/40* (2013.01); *H01M 10/36* (2013.01); *H01M 10/465* (2013.01); *H01M 2220/30* (2013.01); *H02J 7/0047* (2013.01); *Y02E 60/13* (2013.01)

(58) Field of Classification Search
CPC ....................................................... H01M 10/46
USPC .......................................................... 320/107
See application file for complete search history.

(56) References Cited

U.S. PATENT DOCUMENTS 4,172,184 A * 10/1979 Bloom .................... H01M 6/12
                                                                    205/62
4,827,534 A    5/1989 Haugen
(Continued)

FOREIGN PATENT DOCUMENTS

CN    102394181 A    3/2012
CN    102903917 A    1/2013
(Continued)

OTHER PUBLICATIONS

Aminy E. Ostfeld et al: "Screen printed passive components for flexible power electronics", Scientific Reports, vo 1. 5, No. 1, Oct. 30, 2015 (Oct. 30, 2015), pp. 1-11, XP055418843, DOI: 10.1038/srep15959 the whole document.
(Continued)

*Primary Examiner* — Jerry D Robbins
(74) *Attorney, Agent, or Firm* — McCarter & English, LLP

(57) ABSTRACT

A rechargeable power device comprises one or more supercapacitors, at least one rechargeable battery and control electronics arranged to couple the supercapacitor(s) to the at least one rechargeable battery. The rechargeable power device may be operable to rapidly recharge and provide power to electronic equipment, whilst being flexible in structure. The rechargeable power device may be integrated into a user device and/or garment.

16 Claims, 17 Drawing Sheets

(51) Int. Cl.
    *H01M 16/00*    (2006.01)
    *H01M 10/04*    (2006.01)
    *H01G 11/08*    (2013.01)
    *H01M 10/42*    (2006.01)
    *H01G 11/86*    (2013.01)
    *H02J 7/34*    (2006.01)
    *H01M 10/36*    (2010.01)
    *H01G 11/36*    (2013.01)
    *H01M 4/38*    (2006.01)
    *H01G 11/46*    (2013.01)
    *H01M 6/40*    (2006.01)
    *H01G 11/10*    (2013.01)
    *H01M 4/50*    (2010.01)
    *H02J 7/00*    (2006.01)

(56) References Cited

U.S. PATENT DOCUMENTS

| | | | |
|---|---|---|---|
| 2004/0110062 A1 | 6/2004 | Harada et al. | |
| 2004/0161640 A1* | 8/2004 | Salot | H01G 4/40 429/9 |
| 2005/0110468 A1 | 5/2005 | Turner et al. | |
| 2005/0239917 A1* | 10/2005 | Nelson | C09D 11/03 523/160 |
| 2005/0262675 A1* | 12/2005 | Sun | H01G 11/84 29/25.03 |
| 2006/0250113 A1* | 11/2006 | Tsai | H01M 2/1016 320/166 |
| 2009/0152509 A1* | 6/2009 | Choi | H01L 51/0022 252/511 |
| 2010/0116574 A1 | 5/2010 | Gilmore | |
| 2011/0304955 A1 | 12/2011 | Zhou et al. | |
| 2012/0068669 A1* | 3/2012 | Trainor | H01M 10/46 320/167 |
| 2012/0135297 A1 | 5/2012 | Zhang | |
| 2012/0156528 A1 | 6/2012 | Cooley | |
| 2013/0029205 A1 | 1/2013 | Adams et al. | |
| 2013/0266824 A1 | 10/2013 | Cowperthwaite et al. | |
| 2014/0014403 A1* | 1/2014 | Miller | H05K 1/0281 174/260 |
| 2014/0023907 A1 | 1/2014 | Lockett et al. | |
| 2014/0030611 A1* | 1/2014 | Pytlik | H01M 4/8605 429/403 |
| 2014/0315084 A1* | 10/2014 | Liu | H01G 11/68 429/219 |
| 2015/0332861 A1 | 11/2015 | Yin et al. | |
| 2016/0172123 A1 | 6/2016 | Yang et al. | |
| 2016/0238201 A1 | 8/2016 | Ray et al. | |
| 2017/0104363 A1* | 4/2017 | Mukherjee | H01M 4/463 |
| 2018/0138554 A1* | 5/2018 | Mukherjee | H01M 4/381 |

FOREIGN PATENT DOCUMENTS

| | | |
|---|---|---|
| CN | 104900422 A | 9/2015 |
| CN | 105140046 A | 12/2015 |
| CN | 105244183 A | 1/2016 |
| CN | 105551827 A | 5/2016 |
| EP | 1876669 A1 | 1/2008 |
| EP | 2276092 A1 | 1/2011 |
| EP | 2248399 B1 | 8/2015 |
| JP | H08-308103 A | 11/1996 |
| JP | 2000-277118 A | 10/2000 |
| JP | 2012-529734 A | 11/2012 |
| JP | 2016-028386 A | 2/2016 |
| RU | 2310963 C1 | 11/2007 |
| WO | 03/034568 A1 | 4/2003 |
| WO | 2013/080136 A1 | 6/2013 |

OTHER PUBLICATIONS

Ervin Matthew H et al: Inkjet-Printed Flexible Graphene-Based Supercapacitor, Electrochimica Acta, Elsevier Science Publishers, Barking, GB, vol. 147, Oct. 7, 2014 (Oct. 7, 2014), pp. 610-616, XP029096131, ISSN: 0013-4686, DOI: 10.1016/J.ELECTACTA. 2014.10.006 the whole document.
Great Britain Search and Examination Report for Application No. GB1614447.9 dated Feb. 7, 2017.
Huilin Pan et al: Reversible aqueous zinc/manganese oxide energy storage from conversion reactions: Nature Energy, Nature Energy, Apr. 18, 2016 (Apr. 18, 2016), XP055419317, DOI: 10.1038/nenergy. 2016.39 Retrieved from the Internet: URL:http://www.nature.com/articles/nenergy 201639 [retrieved on Oct. 26, 2017] abstract.
International Search Report and Written Opinion for Application No. PCT/GB2017/052485 dated Nov. 7, 2017.
Kim B et al: "Layer-by-layer fully printed Zn—MnObatteries with improved internal resistance and cycle life", Journal of Physics: Conference Series, Institute of Physics Publishing, Bristol, GB, vol. 660, No. 1, Dec. 10, 2015 (Dec. 10, 2015), p. 12009, XP020293742, ISSN: 1742-6596, DOI: 10.1088/1742-6596/660/11012009 [retrieved on Dec. 10, 2015] the whole document.
Nathan A et al: "Flexible Electronics: The Next Ubiquitous Platform", Proceedings of the IEEE, IEEE. New York, US, vol. 100, No. Special Centennial Issue, May 13, 2012 (May 13, 2012), pp. 1486-1517, XP011459592, ISSN: 0018-9219, DOI: 10.1109/JPROC. 2012.2190168 the whole document.
Yi Li et al: "An all-inkjet printed flexible capacitor on a textile using a new poly(4-vinylphenol) dielectric ink for wearable applications", 2013 IEEE Sensors, IEEE, Oct. 28, 2012 (Oct. 28, 2012), pp. 1-4, XP032308576, ISSN: 1930-0395, DOI: 10.1109/ICSENS.2012. 6411117 the whole document.
Examination Report dated Mar. 11, 2019, issued in connection with UK Patent Application No. GB1614447.9 (4 pages).
Office Action and Search Report dated Dec. 24, 2020, issued in connection with Russian Patent Application No. 2019108066, along with English translation thereof (22 pages).
English Translation of Japanese Office Action dated Jun. 1, 2021, issued in connection with Japanese Patent Application No. 2019-510634 (4 pages).
English Translation of Russian Office Action dated Apr. 30, 2021, issued in connection with Russian Patent Application No. 2019108066 (4 pages).
Examination Report dated Apr. 1, 2021, issued in connection with European Patent Application No. 17777623.4 (9 pages).
Examination Report dated Jul. 22, 2019, issued in connection with UK Patent Application No. GB1614447.9 (3 pages).
Examination Report dated Oct. 19, 2018, issued in connection with UK Patent Application No. GB1614447.9 (3 pages).
English Translation of Russian Decision to Grant a Patent for Invention, dated Aug. 30, 2021, issued in connection with Russian Patent Application No. 2019108066 (8 pages).
Chinese Office Action dated Sep. 17, 2021, issued in connection with Chinese Patent Application No. 201780051435.0, and English translation thereof (21 pages).

* cited by examiner

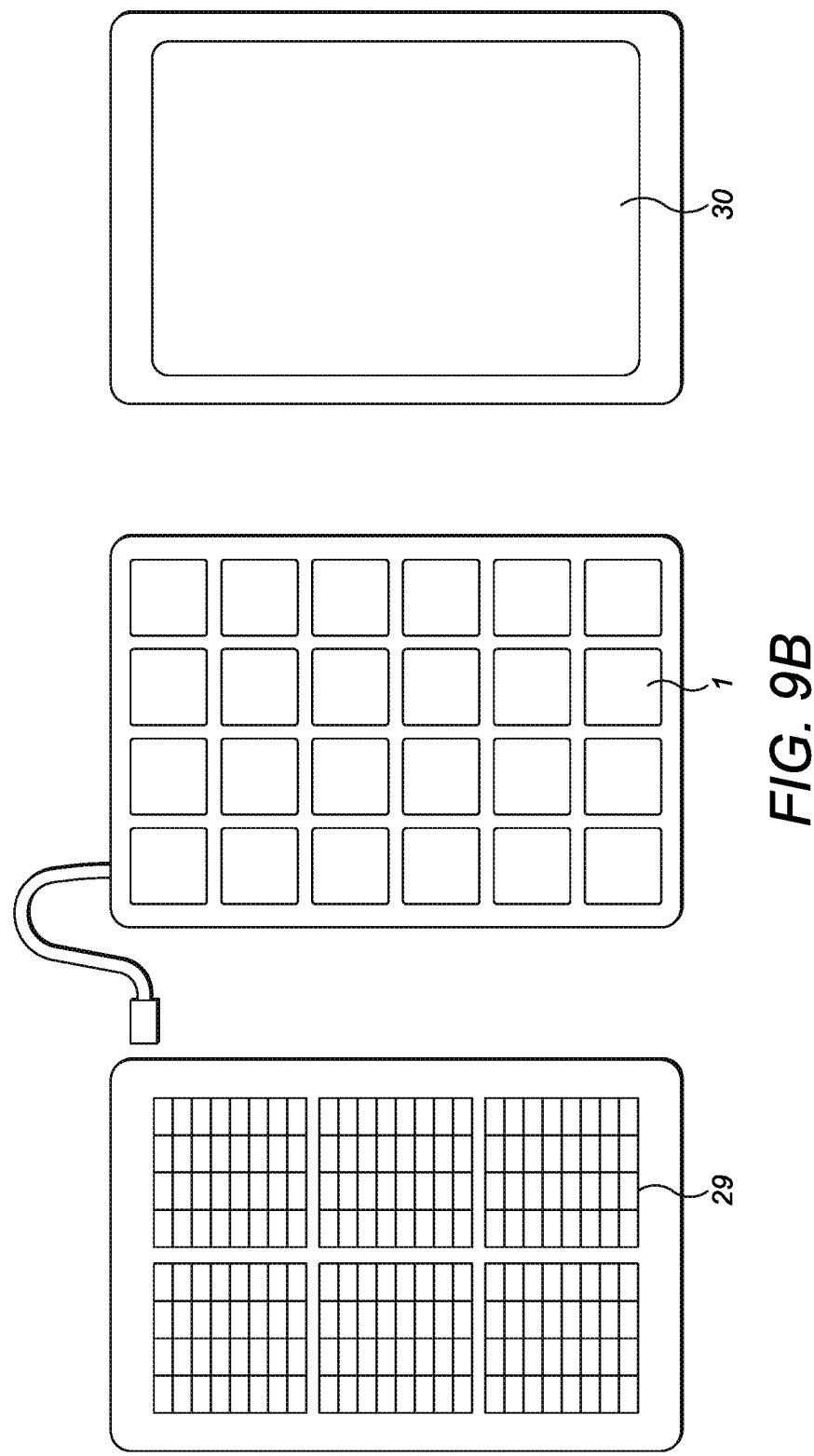

RECHARGEABLE POWER CELLS

CROSS-REFERENCE TO RELATED APPLICATIONS

This application claims the benefit of priority to United Kingdom (Great Britain) Patent application No. 1614447.9 filed Aug. 24, 2016. The entire content of the foregoing patent application is incorporated herein by reference.

FIELD OF THE INVENTION

This invention relates to rechargeable power cells.

BACKGROUND OF THE INVENTION

Conventional rechargeable batteries are typically based on lithium-ion (Li-ion) chemistry. These batteries are usually lightweight and provide voltages of up to 4.2 V, which makes them ideal for powering small electrical and electronic devices.

A limitation of Li-ion rechargeable battery technology is that the charge capacity of a Li-ion battery is directly proportional to the weight of the battery, thus powering higher wattage devices such as power tools and laptop computers results in a heavier Li-ion battery being required. Further limitations are that typically Li-ion batteries take a long time to charge and can be dangerous in some situations due to their highly flammable constituents. By contrast, rechargeable batteries based on nickel-ion (Ni-ion), zinc-ion (Zi-ion) and aluminium-ion (Al-ion) chemistries can be charged rapidly and have higher energy densities than convention Li-ion batteries.

STATEMENTS OF THE INVENTION

Aspects of the invention are defined in the accompanying claims.

BRIEF DESCRIPTION OF THE DRAWINGS

FIGS. 9A and 9B show the power cell implemented in an energy harvesting and light emitting device.

DETAILED DESCRIPTION OF THE EMBODIMENTS

Figure 1:
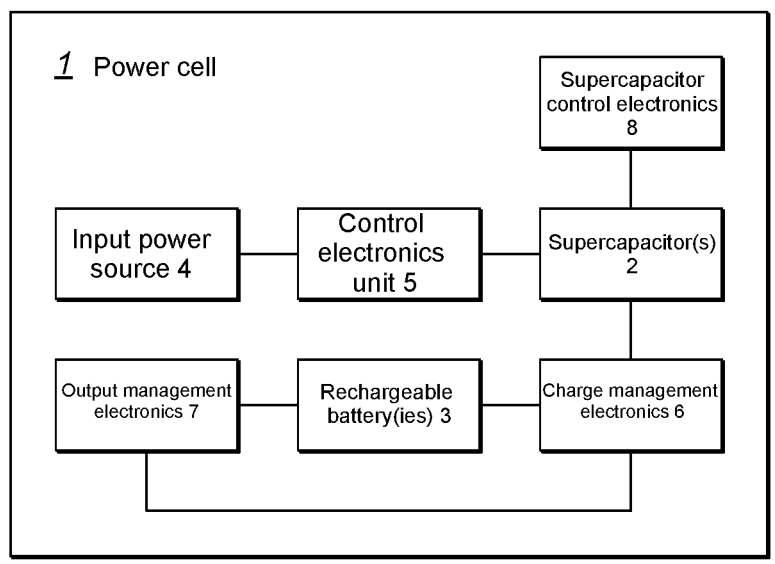
FIG. 1 is a block diagram illustrating an arrangement of components of a power cell in at least some embodiments of the invention.

FIG. 1 shows a block diagram illustrating the arrangement of components of the power cell 1. The power cell 1 comprises an input power source 4 powered from an external power source, which may be a plug-in power supply designed to provide a larger amount of energy to the power cell 1 than standard chargers. Such an input power source may provide more energy than would supplied to a standard rechargeable battery, and may be larger than is normally available using a standard universal serial bus (USB) connection. The input power source 4 is connected to an input power source control electronics unit 5, which in turn is connected to a supercapacitor(s) 2. The input power source control electronics unit 5 may be a system of integrated circuits arranged to safely manage the amount of energy sent to the supercapacitor(s) 2. The supercapacitor(s) 2 may be printed supercapacitors or an array of printed supercapacitors or any similar device or device array, which is customisable in shape and size and suitable for rapidly charging and discharging many times without damaging the internal chemistry of the device.

Energy is rapidly passed from the input power source 4, via the input power source control electronics 5 to the supercapacitor(s) 2. The supercapacitor(s) 2 may be coupled to supercapacitor control electronics 8. The energy is stored in the supercapacitor(s) 2 before being passed onto the charge management electronics 6. The charge management electronics 6 are connected to both output management electronics 7 and at least one rechargeable battery 3. The at least one rechargeable battery 3 is also connected to the output management electronics. The at least one rechargeable battery 3 may comprise a rechargeable battery based on any of Ni-ion, Zn-ion or Al-ion chemistries. Rechargeable batteries based on Ni-ion, Zn-ion and Al-ion chemistries are preferable to Li-ion chemistry as rechargeable batteries based on Ni-ion, Zn-ion and Al-ion chemistries are able to take charge from the supercapacitor(s) 2 at a higher rate.

The energy that is stored in the supercapacitor(s) 2 may be used directly by the output management electronics 7 to power or recharge an electronic device, or the energy that is stored in the supercapacitor(s) 2 may be used to charge the at least one rechargeable battery 3. Both of these of actions remove charge from the supercapacitor(s) 2, thereby providing spare capacity for the supercapacitor(s) 2 to store more charge.

In the event that the energy that is stored in the supercapacitor(s) 2 has been completely passed to the at least one rechargeable battery 3, and/or used by an external device, the supercapacitor(s) 2 will be able to take on more charge at a rapid rate. The energy that is stored in the at least one rechargeable battery 3 can be used to recharge an electronic device and can be recharged by the supercapacitor(s) simultaneously.

The at least one rechargeable battery 3 is unable to exceed a set voltage or discharge rate, thereby preventing it from being used to supply electronic devices that have a higher rate of energy consumption. In this case, due to the substantially high capacity of the at least one rechargeable battery 3, the at least one rechargeable battery 3 can be used to charge the supercapacitor(s) 2. The supercapacitor(s) 2 can then be used through the output management electronics 7 to power an electronic device that requires power supply at rates higher than those achievable by the at least one rechargeable battery 3.

The supercapacitor(s) 2 may be charged substantially faster than a traditional rechargeable battery from a power supply, therefore the supercapacitor(s) 2 provide a substantially decreased charging time for the power cell 1. The energy stored in the supercapacitor(s) 2 is then used to charge the at least one rechargeable battery 3 more slowly, greatly reducing the possibility of damage to the at least one rechargeable battery 3 and freeing capacity of the supercapacitor(s) 2 to store more charge, rapidly, at the next charging opportunity. While connected to the external power supply, the input power source control electronics 5 can charge the supercapacitor(s) 2 rapidly, and the at least one rechargeable battery at the same time. When the external power supply is disconnected, the supercapacitor(s) 2 can transfer charge to the at least one rechargeable battery 3 for long-term storage.

When the power cell 1 is connected to a standard USB power supply, the power cell will charge the at least one rechargeable battery 3 at a rate sustained by the device supplying the charge.

The components of the power cell 1 may comprise an assembly of multiple layers of active materials which may be printed by using contemporary printing techniques such as screen printing, ink-jet printing, flexographic printing, stencil printing and rotogravure printing on a variety of electrically conductive substrates. The substrates may be flexible, semi-flexible or rigid. The power cell 1 may be manufactured by roll-to-roll or batch manufacturing processes.

High capacity, printed, rechargeable batteries 3, based on Zn-ion, Ni-ion or Al-ion chemistry, may be connected advantageously to the supercapacitor(s) 2. Theoretical volumetric capacity values are presented in the below table, showing that multivalent cations such as $Ni^{2+}$, $Zn^{2+}$ and $Al^{3+}$, which have the ability to contribute more than one electron in an electrochemical reaction, lead to higher capacity values than a $Li^+$ ion. A comparable trend is observed in the case of screen printed $Ni^{2+}$, $Zn^{2+}$ and $Al^{3+}$ based rechargeable batteries, where an average specific capacity of >150 mAh/g is obtained.

| Ion | Standard Electrode Potential (V) | Volumetric Capacity (mAh/cm$^3$) |
|---|---|---|
| $Li^+$ | −3.05 | 2044 |
| $Ni^{2+}$ | −0.25 | 8133 |
| $Zn^{2+}$ | −0.76 | 5854 |
| $Al^{3+}$ | −1.66 | 8046 |

Rechargeable Battery

The at least one rechargeable battery 3 may comprise current collector substrates, printed electrode materials for an anode and a cathode, an electrolyte and a separator between the electrodes. The layers of the at least one rechargeable battery 3 may be printed by using contemporary printing techniques such as screen printing, ink-jet printing, flexographic printing, stencil printing and rotogravure printing.

The current collector substrates may be metallic or non-metallic, and provide a physical support for the printed electrode materials. Metallic current collector substrates may comprise any of copper, aluminium, nickel, titanium, steel, silver nanowire coated PET/PEN/PI, or any other metallic material. Non-metallic current collector substrates may be any of indium tin oxide coated PET/PEN/PI, titanium nitride coated PET/PEN/PI, Poly (3, 4-ethylenedioxythiophene) polystyrene sulfonate coated PET/PEN/PI, or any other non-metallic material. The anode and cathode may comprise either the same, or different, current collector materials as one another.

The anode and cathode (electrode) materials for the at least one rechargeable battery may be formulated in the form of slurries in an aqueous binder system. The aqueous binder system may comprise but is not limited to polyvinyl alcohol, polyvinyl pyrrolidone, methylcellulose, carboxymethyl cellulose, methyl hydroxyethyl ether cellulose, hydroxyethyl ether cellulose, poly (2-hydroxypropyl methacrylate), polyethylene oxide, polyacrylamides, casein, polyacrylic acid, or guar gum derivatives. The physical properties of the formulated slurries may be optimised depending on the printing process involved and the surface morphology of the current collector substrates used in the rechargeable battery manufacturing.

Slurries containing Ni, Zn or Al may be screen printed in air, directly onto a current collector material, followed by heat treatment in a convection oven to obtain sintered anodes. Sintered anodes may also be produced by unconventional heat treatment techniques such as near infrared heating, or photonic sintering, in an extremely small amount of time. This is beneficial for roll-to-roll manufacturing of the rechargeable battery materials.

Cathodes for the at least one rechargeable battery 3 may be made from layered material including but not limited to $\alpha$-$MnO_2$, $\lambda$-$MnO_2$, $TiO_2$, todorokite, zinc-hexacyanoferrate, copper-hexacyanoferrate, spinel-$Mn_2O_4$, nickel-hexacyanoferrate, aerogels, $V_2O_5$, graphite, graphene, carbon nanotubes, oxygen containing perovskite compounds, clays and talc. As with the anodes, slurries containing cathode materials may also be screen printed in air onto current collector substrates and heat-treated either in an oven or using near infrared heating or photonic sintering techniques.

Aqueous, non-flammable electrolytes may be used for Ni-ion, Zn-ion and Al-ion rechargeable batteries, which are comparably less toxic than organic solvent equivalents. These electrolytes contain salts of corresponding metal ions, including but not limited to: $NiSO_4$, $ZnSO_4$, $AlCl_3$ and $Al_2(SO_4)_3$. These electrolytes may contain a number of additional additives for tuning various electrochemical properties of the Ni-ion, Zn-ion and Al-ion rechargeable batteries, including the voltage, current, ionic mobility, internal resistance, corrosion kinetics, and others. These electrolytes may be stable in air, hence rechargeable batteries based on Ni-ion, Zn-ion and Al-ion chemistry may be assembled in ambient conditions.

Ni, Zn or Al based secondary batteries manufactured in this manner do not require any flammable or aggressive chemicals; the electrolytes and slurries for making the electrodes may be purely based on water. As such, rechargeable batteries based on Ni, Zn and Al are more environmentally friendly and safer than conventional Li-ion based rechargeable batteries and other such devices.

Supercapacitor

The supercapacitor(s) 2 may be printed using conventional printing techniques such as screen printing, ink-jet printing, flexographic printing, stencil printing and rotogravure printing, or any other roll to roll process. Electrodes of the supercapacitor(s) may contain a range of high surface area functional materials including, but not limited to, graphene, activated charcoal, carbon nanotubes, metal oxides, layered oxides, hydroxides, aerogels and nanoporous foams. These functional materials may be blended with an aqueous binder system which may contain, but are not limited to, polyvinyl alcohol, polyvinyl pyrrolidone, methylcellulose, carboxymethyl cellulose, methyl hydroxyethyl ether cellulose, hydroxyethyl ether cellulose, Poly (2-hydroxypropyl methacrylate), polyethylene oxide, polyacrylamides, casein, polyacrylic acid or guar gum derivatives for preparing screen printable electrode materials in the form of slurries. Printed electrodes for the supercapacitor(s) may be prepared on current collector substrates, said current collector substrates may be metallic or non-metallic, and provide a physical support for the printed electrode materials.

Metallic current collector substrates of the supercapacitor(s) 2 may comprise any of copper, aluminium, nickel, titanium, steel, PI and silver nanowire coated PET/PEN/PI, or any other metallic material. Non-metallic current collector substrates may be any of indium tin oxide coated PET/PEN/PI, titanium nitride coated PET/PEN/PI, Poly (3,4-ethylenedioxythiophene) polystyrene sulfonate coated PET/PEN/PI, or any other non-metallic material.

Said printed electrodes may be heat-treated using near infra-red, photonic or oven heating techniques. Printed supercapacitors produced in this manner may be assembled using similar or dissimilar electrode materials for achieving optimised electrochemical performance. The electrodes of the supercapacitor(s) may be either 'symmetric' or 'asymmetric' in nature. The performance of asymmetric type supercapacitors is improved by combining one or multiple types of metal oxides and hydroxides with carbon-based materials in such a way that higher voltage and capacitance values are obtained from the resulting product. For example, in a $MnO_2$-activated carbon based asymmetric supercapacitor, one electrode is made from $MnO_2$ and the other is activated carbon. In symmetric supercapacitors, both electrodes are the same and are made of either carbon or metal oxides with an optimised performance.

Both asymmetric and symmetric supercapacitors do not require any harmful or aggressive chemicals during the entire manufacturing process. These supercapacitors may include a form of rechargeable secondary cell, provided the process of rapid charge and discharge does not adversely affect them.

Electrochemical performance of said printed supercapacitors produced in this manner may be controlled using different types of electrolyte systems. Electrolytes for said printed supercapacitors may be formulated in aqueous medium, accompanied by one or more additives for tuning electrochemical properties such as voltage and capacitance.

Exemplary Fabrication Procedures

Exemplary fabrication procedures for components of the power cell 1 will be described below. In this context exemplary defines an example fabrication procedure and does not necessarily define a preferred embodiment.

Zn-Ion Rechargeable Battery

A screen printed anode is prepared for a Zn-ion rechargeable battery. Zinc metal particles with <10 µm particle size are added to a chemically modified PVA based binder at 90 wt % concentration and stirred overnight at 40° C. to obtain a viscous slurry with homogenously distributed Zn particles. Chemically modified PVA results in improved adhesion between the sintered particles and the current collector materials. It also produces a uniform dispersion of Zn particles in the binder system, thereby achieving a smooth surface finish for a sintered anode. The viscous slurry containing Zn particles is then screen printed, in air, onto a titanium nitride (TiN) coated steel foil, followed by heat treatment using a near-infrared oven to produce sintered anodes of fused Zn particles.

A screen printed cathode, made from $\alpha$-$MnO_2$, is prepared by dispersing $\alpha$-$MnO_2$ particles into a chemically modified PVA binder. The cathode mixture containing $\alpha$-$MnO_2$ and PVA is stirred overnight at 40° C. to obtain a homogenous slurry which is screen printed in air on a separate TiN coated steel substrate, followed by the removal of excess binder using a near infrared heating technique.

The Zn-ion rechargeable battery cell is assembled in air by sandwiching the electrodes (Zn anode and $\alpha$-$MnO_2$ cathode) together, separated by a thin separator material (~20 µm thickness) soaked in aqueous $ZnSO_4$ electrolyte. The separator material in this case may be paper based or CELGARD™, depending on the nature of application. Finally, the assembled Zn-ion rechargeable battery cell is encapsulated using a laminated aluminium pouch, followed by the attachment of ultrasonically welded copper foil contacts to the electrode materials.

Printed Supercapacitor

A mixture of $V_2O_5$ and $Ni(OH)_2$ are formulated at a 1:1 ratio in a water based binder containing chemically modified PVA. Said formulation is sonicated for 5 hours, followed by overnight stirring at 40° C. to obtain a viscous paste (electrode paste) for printing supercapacitor electrodes. The electrode paste is then screen printed onto TiN coated steel substrates and sintered using a photonic sintering unit. A symmetrical supercapacitor cell is assembled by stacking two identical electrode plates on top of one another, separated by a CELGARD™ membrane coated with an acidic electrolyte in gel form. The whole cell is then encapsulated in a plastic pouch, followed by ultrasonic welding of electrical contacts at the terminals of the electrode plates.

Specific Embodiments

Figure 2A:
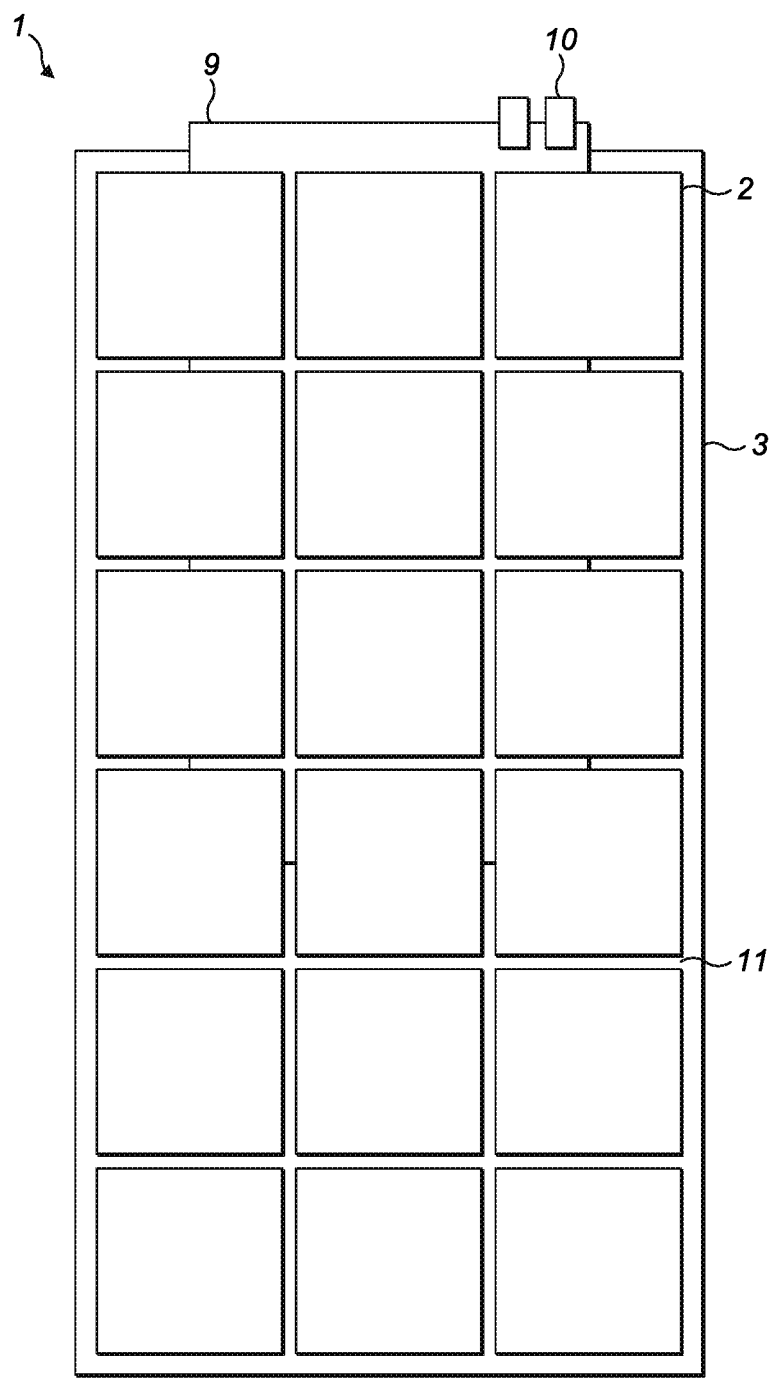
FIGS. 2A and 2B show a first embodiment of the power cell.

FIG. 2A shows a specific embodiment of the power cell 1. The rechargeable battery 3 is a roll-to-roll screen printed battery fully customisable to any shape or size. The array of supercapacitors 2 provide increased flexibility for the device as gaps 11 between the supercapacitors of the array of supercapacitors 2 allow for a much greater bending angle than possible if only a single supercapacitor were used. The operation of the power cell is controlled by the control circuit 9, which comprises a combination of the input power source control electronics 5, the charge management electronics 6, the output management electronics 7 and the capacitor management electronics 8. The power cell 1 comprises connection terminals 10 for connection to an external device. The connection terminals 10 can also include a plurality of other connections that could be connected to the management electronics of the control circuit 9 to perform additional tasks, such as but not limited to device identification.

Figure 2B:
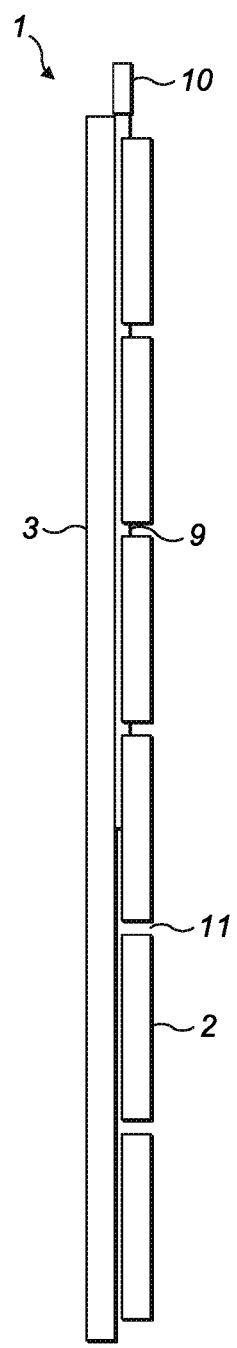

FIG. 2B shows a side-view of the embodiment of FIG. 2, demonstrating the array of supercapacitors 2 being mounted on one side of the rechargeable battery 3, with the control circuit 9 positioned therebetween.

Figure 3:
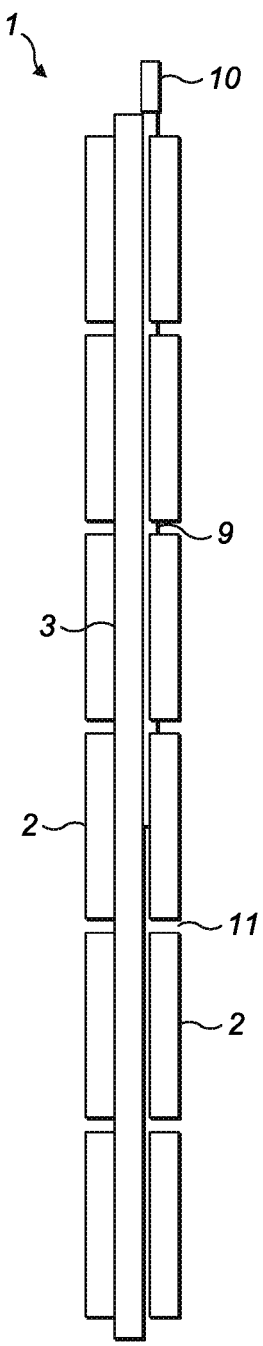
FIG. 3 shows a second embodiment of the power cell, comprising arrays of supercapacitors on both sides of the rechargeable battery.

FIG. 3 shows a second embodiment, similar to the first embodiment, with the exception that the array of supercapacitors 2 are provided on both sides of the power cell 1.

Figure 4:
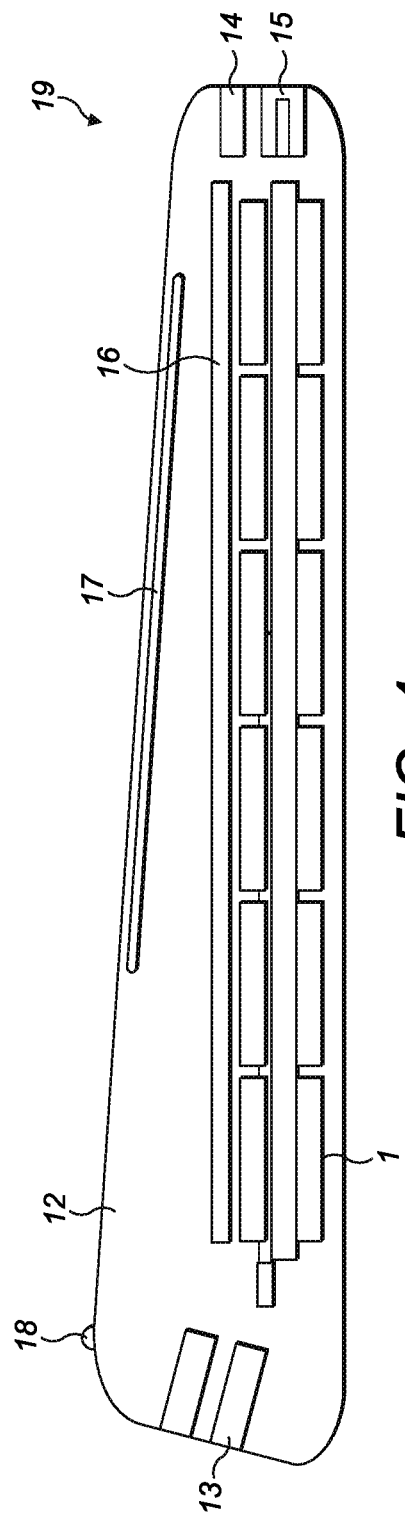
FIG. 4 shows the power cell implemented in a secondary power unit.

FIG. 4 shows the power cell 1 implemented in a secondary power unit 19 that can be used to inductively charge an electronic device, such as a phone. The secondary power unit comprises a protective casing 12, an output socket 13 for outputting charge to an electronic device, which may be a USB connection port or any other output port format, and an input socket 14, which may be a USB connection port, or any other input port format. The secondary power unit further comprises a rapid charger socket 15, device control electronics 16, inductive charge electronic and transmission units 17 and a charge level indicator 18.

Figure 5:
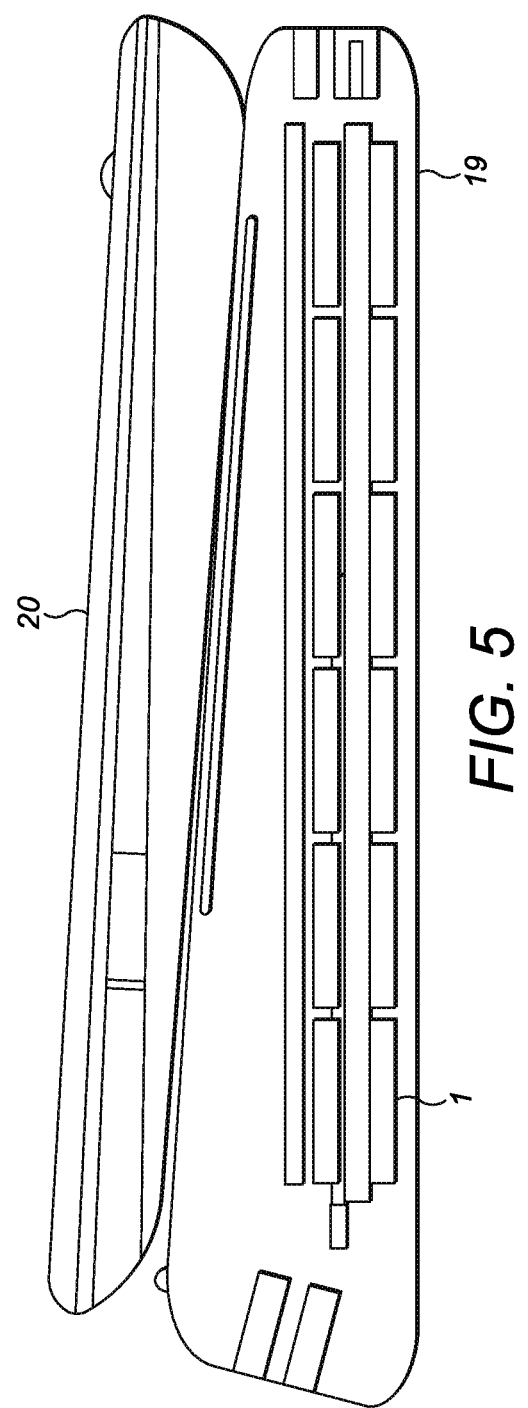
FIG. 5 shows the power cell implemented in a secondary power unit, operated to inductively charge a consumer electronic device.

FIG. 5 shows an implementation of the power cell 1 of FIG. 4, in which a consumer electronic device 20, with an inductor charging coil, is being charged by the secondary power unit 19. In the event the consumer electronic device does not have an inductive charging coil, the consumer electronic device can be connected to the secondary power unit 19 by the output socket 13, as described in relation to FIG. 4.

Figure 6A:
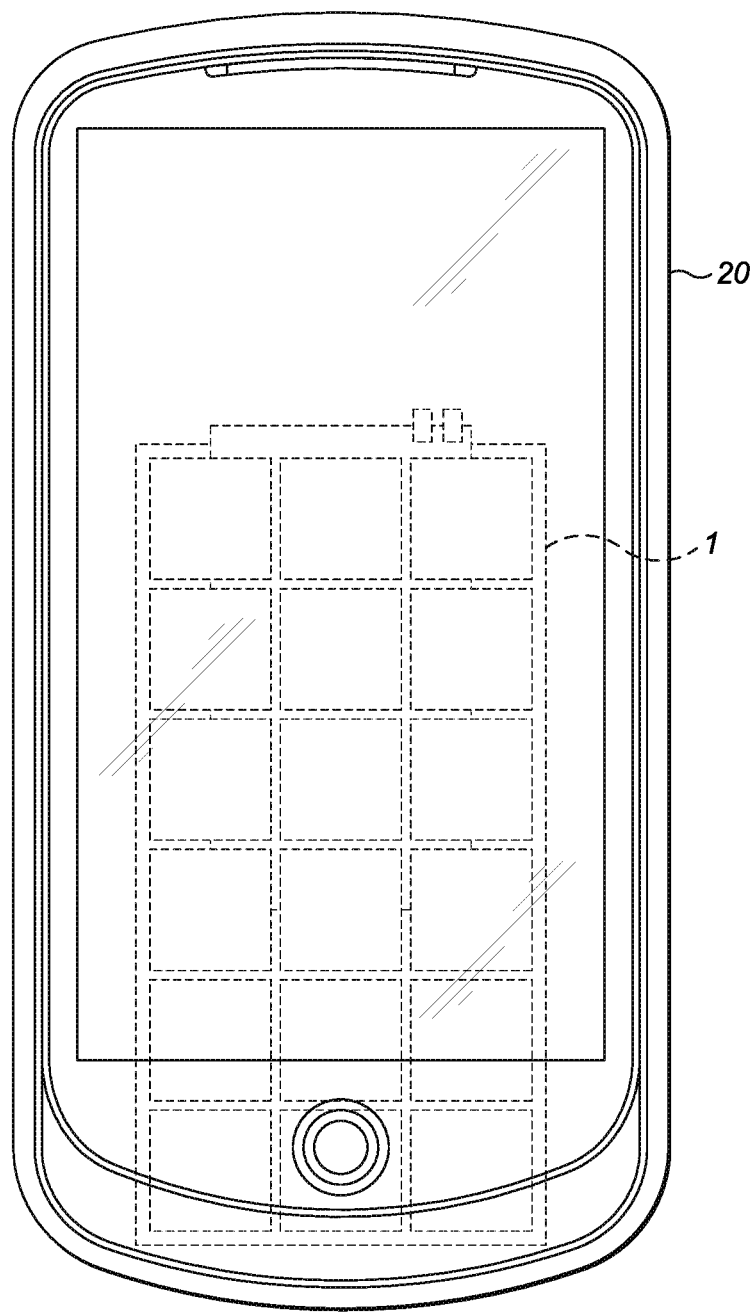
FIGS. 6A and 6B show the power cell implemented directly into a consumer electronic device.
Figure 6B:
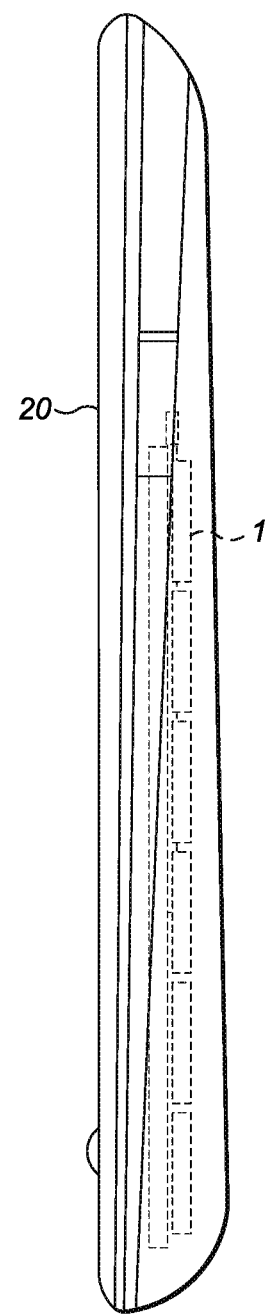

FIGS. 6A and 6B show front and side views of the power cell 1 implemented directly into a consumer electronic device 20.

Figure 7:
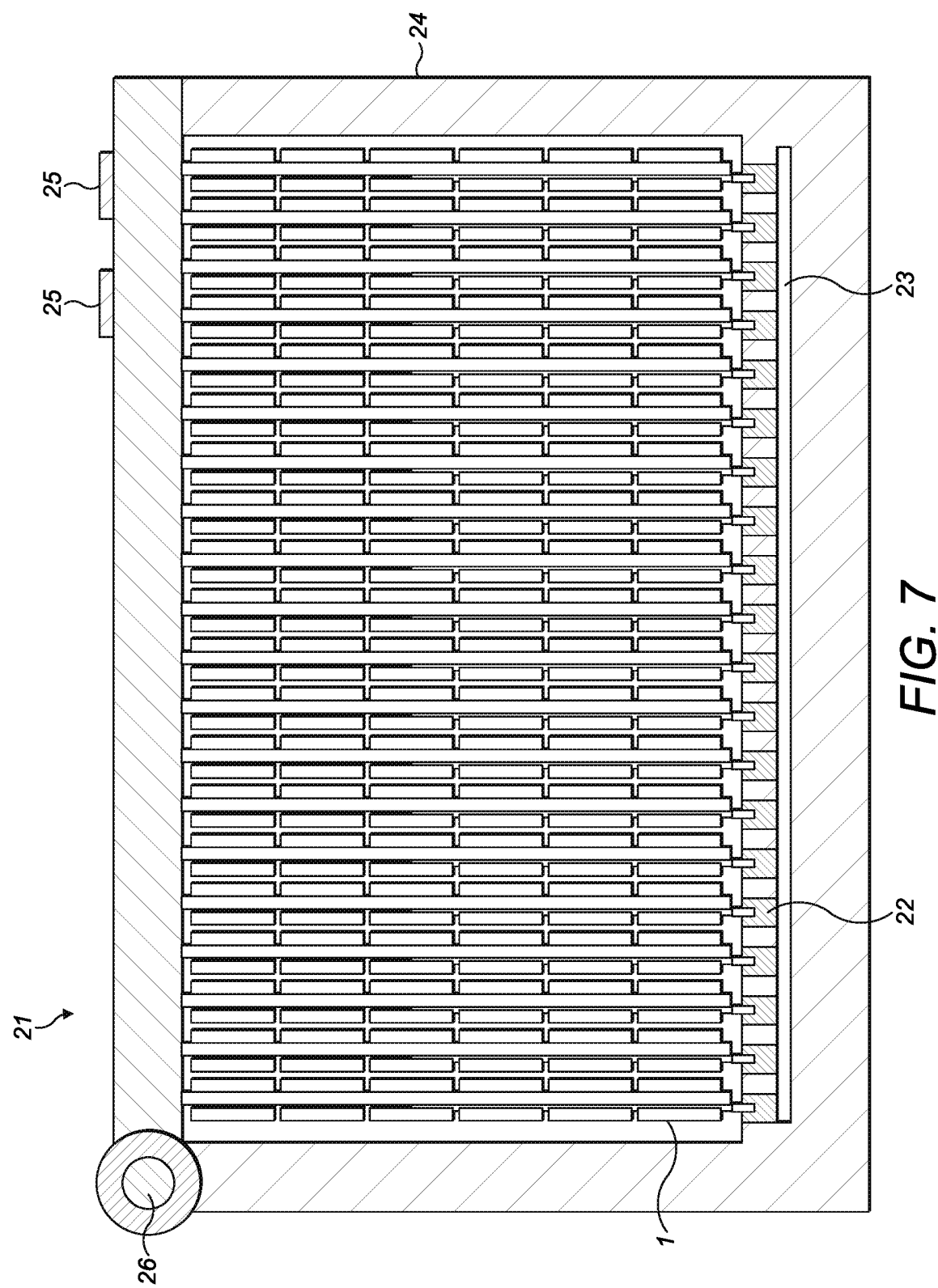
FIG. 7 shows a series of power cells arranged in a power cell array.

FIG. 7 shows a series of power cells 1, arranged in a power cell array 21 designed to deliver large amounts of energy to applications such as automotive equipment, and other large scale equipment which may have similar needs. The array of power cells 1 are connected together to form energy banks that are capable of being configured in many ways, depending on the requirements of the application. Push-in connectors 22 enable simple and fast removal of power cells 1 for quick replacement. The push-in connectors 22 are specifically useful for swapping power cells 1 that have been depleted for fully charged power cells 1. For example, an electric car having a power cell array 21 allows the user to remove the depleted power cells 1 and place the depleted power cells 1 in a recharge slot of a dispenser, with the dispenser dispensing a fully charged power cell in return. The user may then simply insert the replacement power cell 1 into the available slot of the power cell array 21. A similar scenario may apply when the user has a second set of power cells 1 in a charge unit at home or his or her workplace. Charging of the power cells may also be undertaken when the power cells 1 are housed within the populated power cell array 21.

The power cell array 21 comprises a configurable control board 23 that may be fully or partly populated by power cells 1, depending on the requirements of the application. Using a smart programming option, instructions may be sent to the control board 23 and associated electronics to put the power cells 1 in a configuration that delivers the correct amount of energy to positive and negative terminals 25.

The power cell array 21 further comprises a casing 24 that protects the power cells 1 and corresponding electronic control systems, and also provides an environment that is suitable for the optimised operation of the power cells 1. A hinge 26 is provided that enables the top of the casing to be opened for the power cells 1 to be changed.

In some embodiments, information may be sent between the power cell control electronics and the application to which the power cell array 21 is connected. The information may be sent as a signal over the positive and negative terminals 25, or over one or more separate data terminals.

Figure 8:
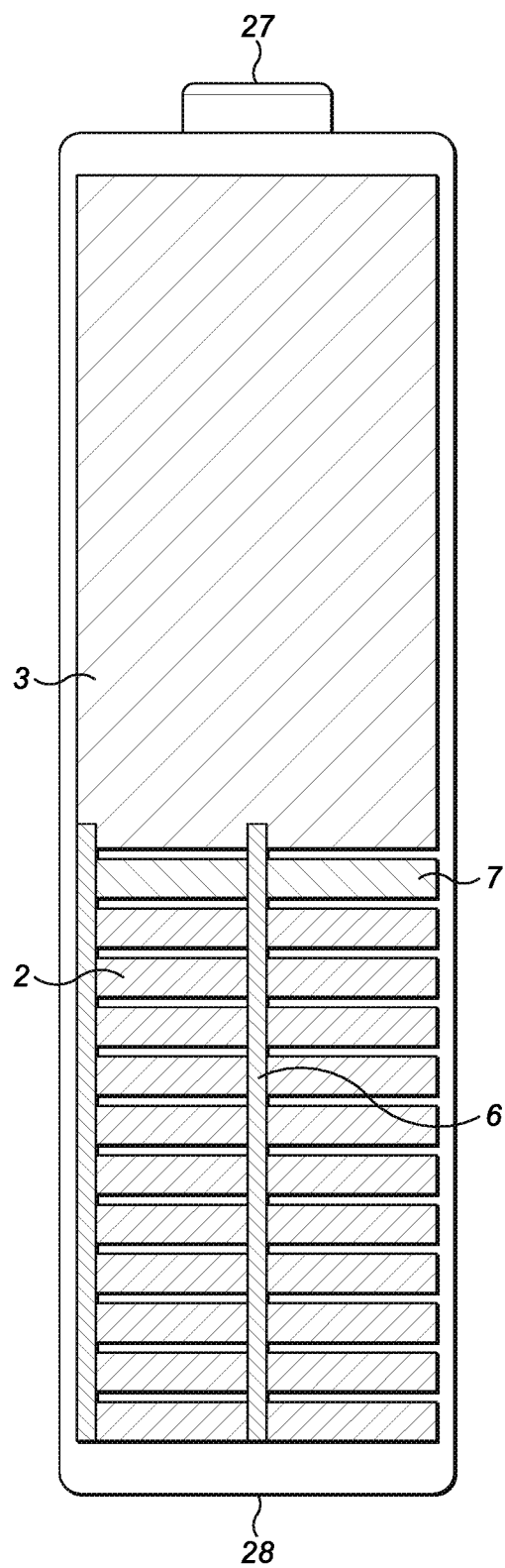
FIG. 8 shows the power cell implemented in a traditional battery type structure.

FIG. 8 shows an embodiment of the power cell implemented in a conventional battery type structure, such as AAA or AA, or other battery types. The embodiment comprises a supercapacitor(s) 2, at least one rechargeable battery 3, charge management electronics 6 and output management electronics 7, as well as a positive connection terminal 27 and negative connection terminal 28.

Figure 9A:
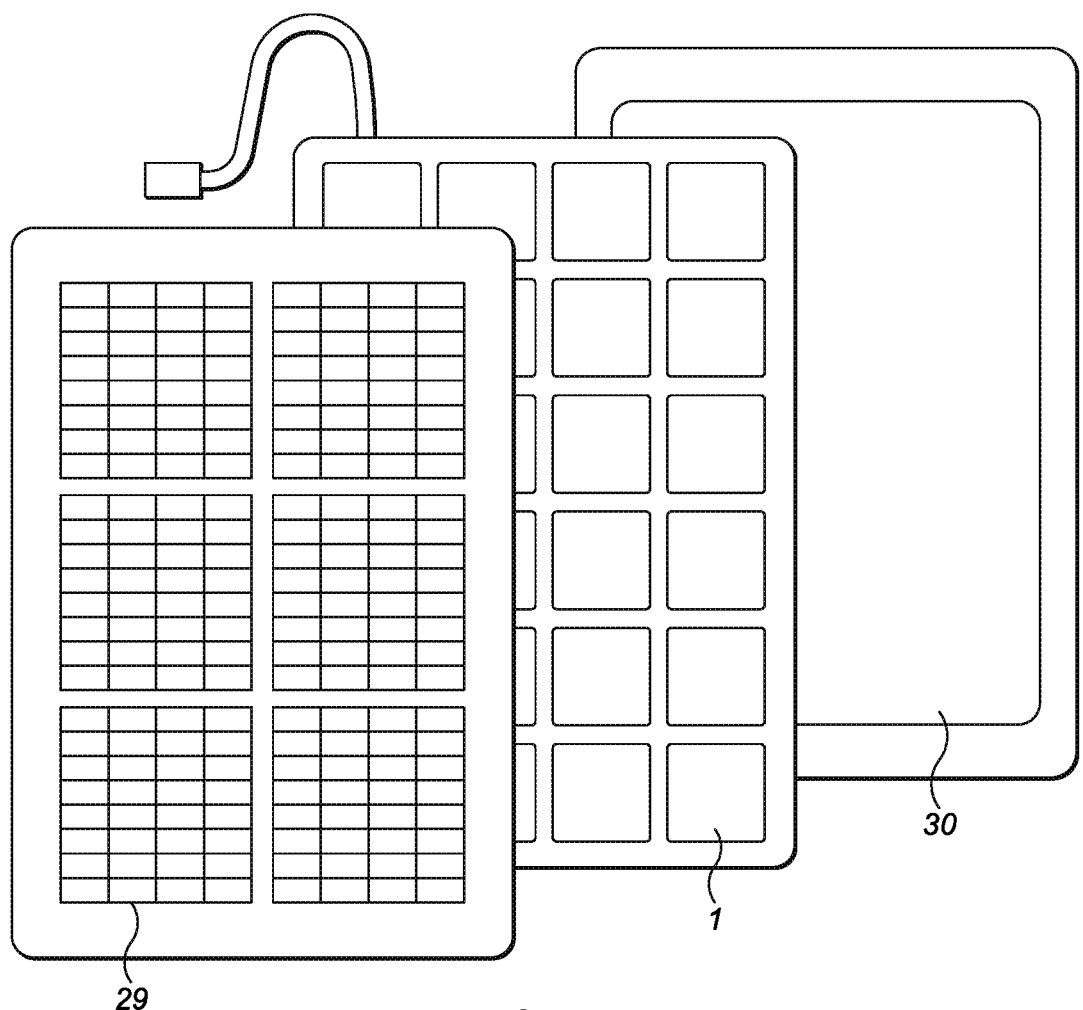

FIG. 9A shows an embodiment of the invention comprising a multilayer device in which the power cell 1 is implemented. The supercapacitor(s) 2 and the at least one rechargeable battery 3 are split into thin films and spread over a wide area. The multilayer device provides energy harvesting through an array of photovoltaic cells 29, power storage and power output, using a large area power cell 1, to charge and/or power consumer electronic devices, as well as a large wide area lighted surface 30 which may be used for lighting dark areas or for signalling for assistance.

The multilayer device comprises an array of photovoltaic cells 29, that are optimised to be lightweight, robust, waterproof and matched to power reclamation electronics of the multilayer device. The energy harvested from the array of photovoltaic cells 29 is stored in a large area power cell 1. The large area power cell 1 is sandwiched between the array of photovoltaic cells 29 and a large area lighted surface 30. The multilayer device may include a detachable connection system, for example but not limited to a USB interface, for charging and/or powering consumer electronic devices. The multilayer device may further include a fast charging power connector. The array of photovoltaic cells 29, large area power cell 1 and large area lighted surface 30 may be encapsulated together in a waterproof cover.

FIG. 9B shows a front view of the array of photovoltaic cells 29, large area power cell 1 and large area light surface 30 of the multilayer device as described with reference to FIG. 9A. The array of photovoltaic cells 29 may be flexible and protected from damage resulting from impact, water, freezing temperatures and excessive heating. The electrical contact may be encapsulated in such a way as to stop corrosion. The large area power cell 1 may be made of thin flexible cells, fabricated by any method as previously described in this document. Each section may be made from an array of supercapacitors and at least one rechargeable battery, connected together as previously described. Distributing the power cell energy storage components over a large area may provide evenly distributed weight across the device, as well as making the device thinner and more flexible. The large area lighted surface 30 may be made from light emitting diode (LED) units configured in such a way as to distribute light evenly across the surface, or electroluminescent material coated over a number of conductors, or any other kind of light emitting technology. In an embodiment the array of photovoltaic cells 29, the large area power cell 1, and large area lighted surface 30 may be encapsulated together into one device which may be hardwearing and flexible.

Figure 10:
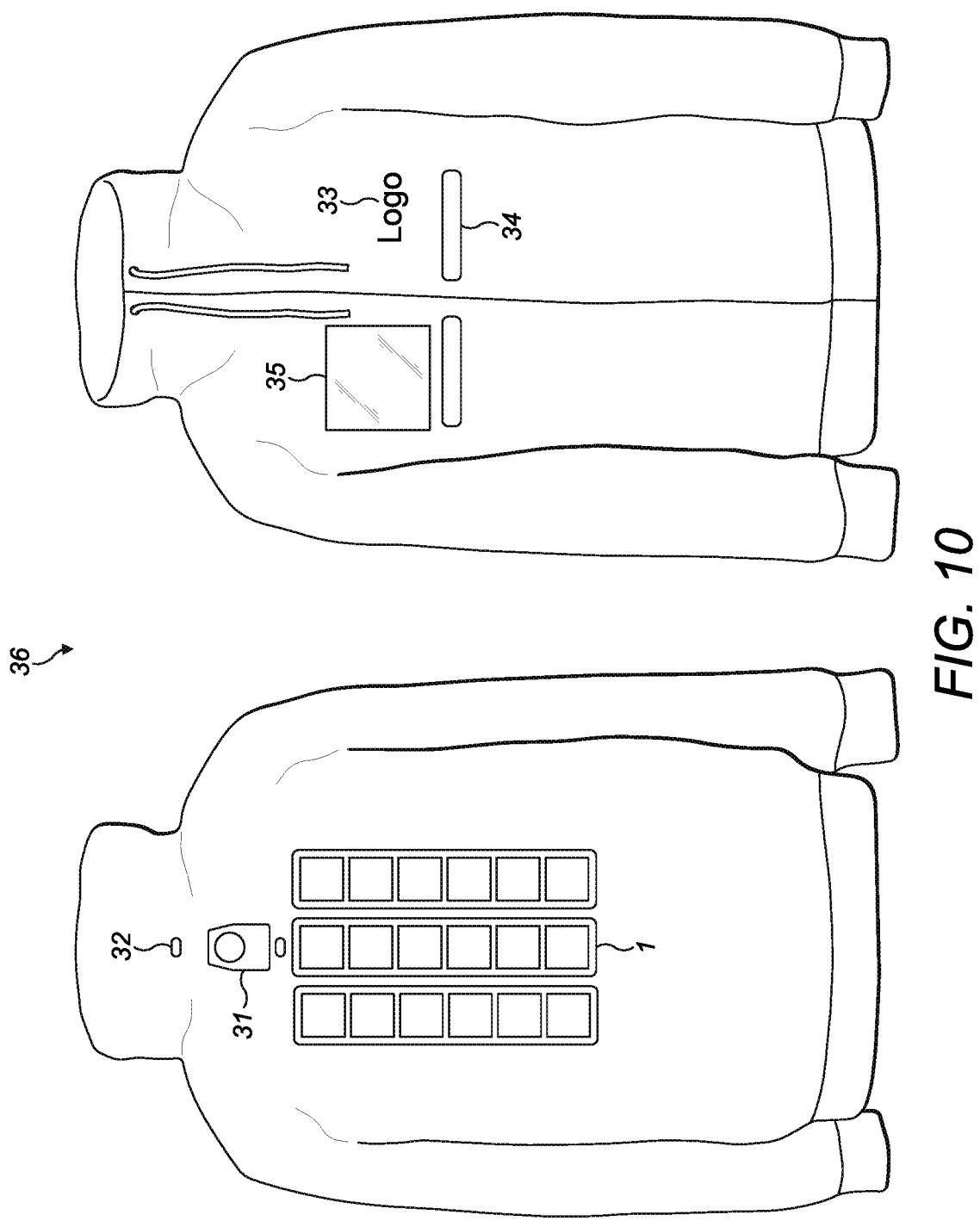
FIG. 10 shows a first embodiment of the power cell implemented in a garment.

FIG. 10 shows the power cell 1 incorporated into a garment 36 such as but not limited to a jacket, sweatshirt, t-shirt, hoody, tracksuit top or other such garment. The flexible and thin power cell 1 may be structured as previously described in this document. The power cell 1 may be positioned at the back of the garment 36, sandwiched between an outer fabric layer and inner fabric layer. The power cell 1 may be connected to a programmable microcontroller 31, which may be padded between the inner and outer layer of the garment 36. The programmable microcontroller may handle any input and/or outputs to and from sensors 32 embedded in the garment 36, and pass data to visual and/or audible output devices, and/or make a record of the data for devices which may be built-in or remotely connected to the garment 36 using methods such as Wi-Fi®, Bluetooth®, infrared, fibre optic, non-human evident audio signals, and/or other methods of signal transmission or reception.

The sensors 32 may include but are not limited to motion sensors and other types of sensors. The motion sensor is designed to sense the motion of the garment 36 and pass associated data to the programmable microcontroller 31. The programmable microcontroller 31 and sensors 32 may be powered by the power cell 1. Other input and output devices may also be connected to the system and be powered by the power cell 1. Output devices may include an electroluminescent logo 33 which may provide an illuminated branding logo on the garment 36 as well as visible aid for use in low-light environments. Connections for a heart monitor 34 may be placed on the body of a user wearing the garment 36, then when the garment 36 is removed the connections for a heart monitor 34 may be placed in a pocket on the inside of the garment 36. The heart monitor 34 may be powered by the power cell 1. The garment 36 may include a display screen 35 that can display data from the sensors, as well as any other information that may be required. Other indicators, safety lights, energy harvesting or plug-in ports for accessories may be built into the system, depending on the use of the garment 36.

Figure 11:
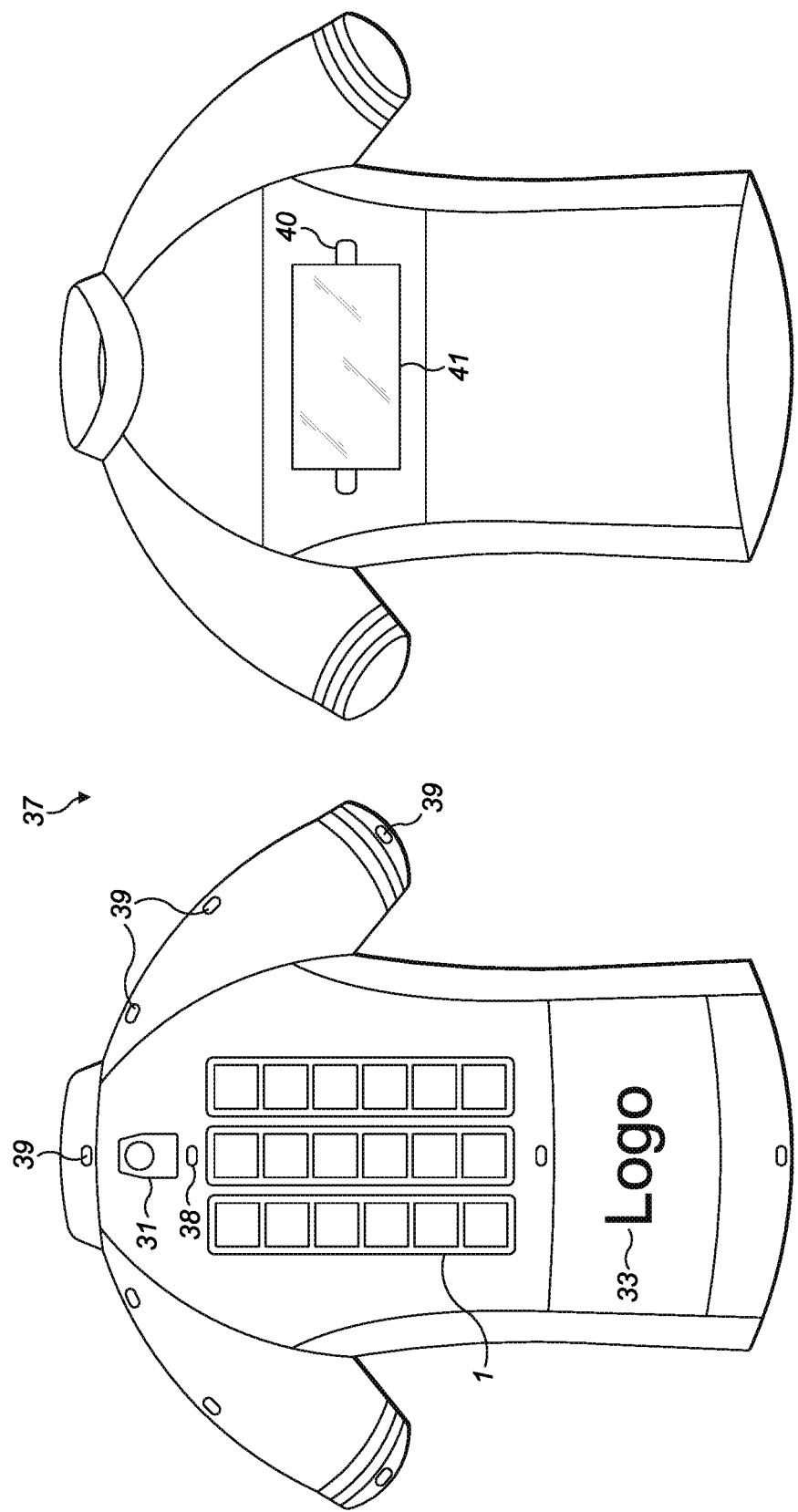
FIG. 11 shows a second embodiment of the power cell implemented in a garment.

FIG. 11 shows a second example of a garment 37 in which the power cell 1 may be integrated. The garment 37 comprises a fully integrated sport shirt that may be used to monitor numerous activities of a user over a long period of time. This is possible due to the fast charging and high capacity of the power cell 1, while being lightweight and incorporated into the garment 37 in a balanced, safe and comfortable manner. The garment 37 may comprise a power cell 1, at least one tilt and centre of gravity sensor 38, a programmable microcontroller 31 and a plurality of motion sensors 39 used to plot and record the movement of the user in detail. The garment 37 may further comprise an electroluminescent logo 33, which may be used to identify the garment and provide enhanced visibility. Additionally, the garment may comprise an internal heart, temperature and perspiration monitor 40, and a display 41 to visualise the users progress and/or provide a visible aid in the dark.

Figure 12:
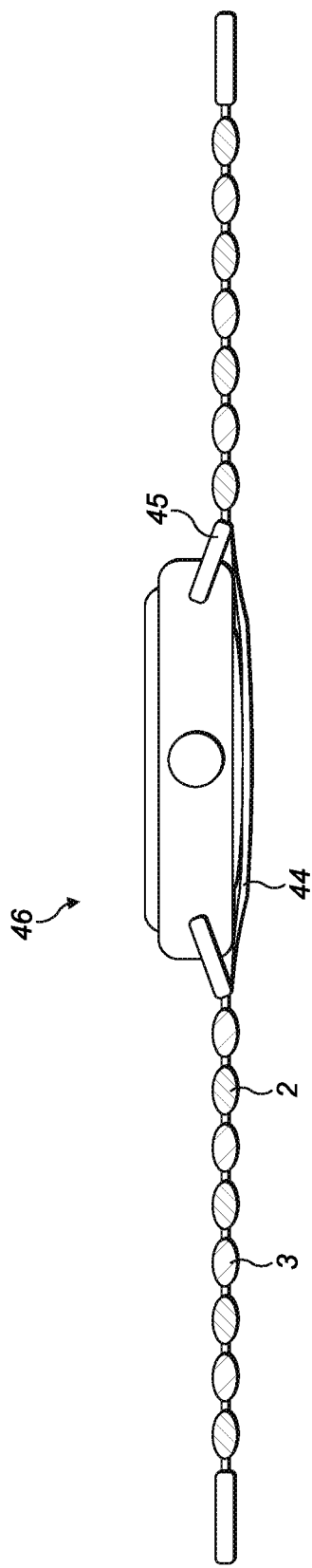
FIG. 12 shows a first embodiment of the power cell implemented in a wearable technology device.

FIG. 12 shows an embodiment of the invention in which the power cell is integrated into a wearable technology device 46, such as but not limited to a smart watch. The power cell may be incorporated into the watch strap such that the watch strap comprises at least one micro cell rechargeable battery 3 and a supercapacitor(s) 2. The wearable technology device may further comprise an inductive charging pad 44 and electronics, which may have an opening in a section of the pad to accommodate sensors that may be integrated into the wearable technology device 46. A connecting section 45 may be included between the strap and the wearable technology device 46. This configuration is designed to provide an additional source of power to prolong the operational time of the wearable technology device 46 in normal daily use. In some cases, the configuration of the power cell may be the only source of power for the wearable technology device 46.

Figure 13:
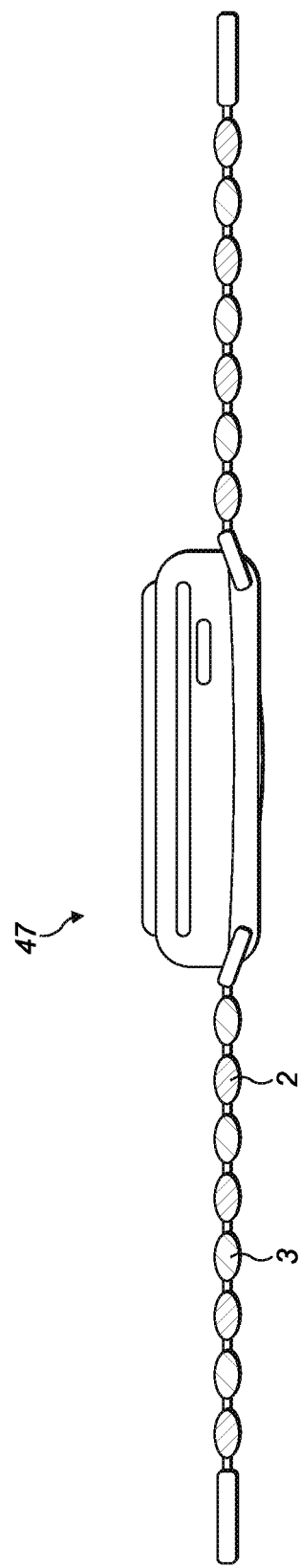
FIG. 13 shows a second embodiment of the power cell implemented in a wearable technology device.

FIG. 13 shows a wearable technology device 47 similar to that of FIG. 12, with the exception the power cell is connected to the wearable technology device by way of a connector built into the wearable technology device itself. This means there may not be a need for an inductive charging pad, and the control electronics may be built into the wearable technology device.

Figure 14:
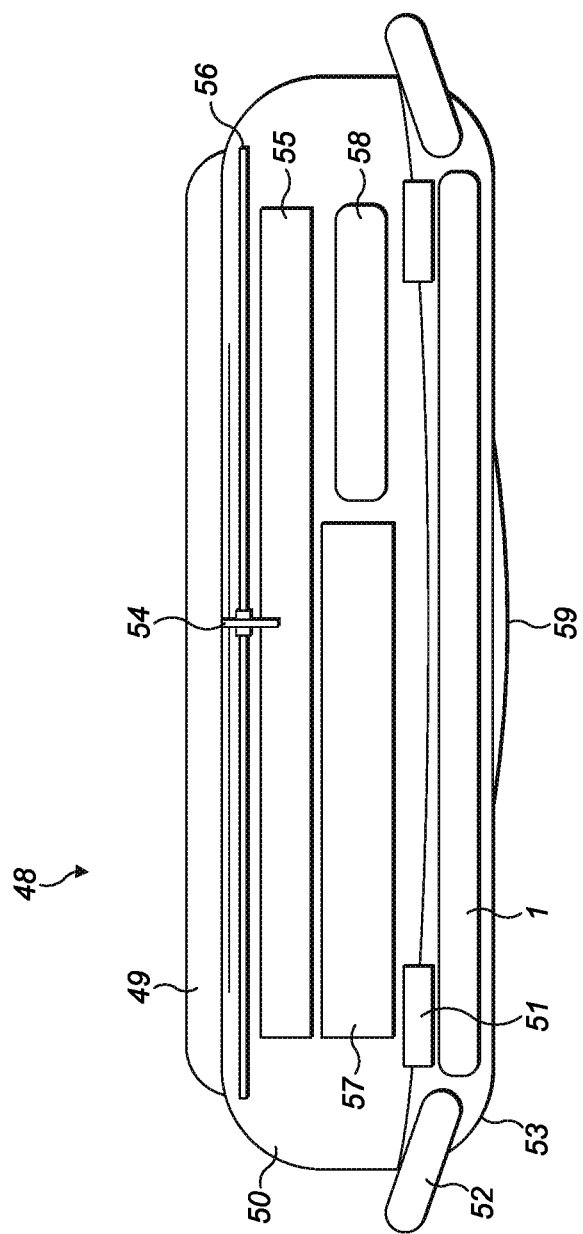
FIG. 14 shows a third embodiment of the power cell implemented in a wearable technology device.

FIG. 14 shows an embodiment of the invention in which the power cell 1 may be integrated directly into a wearable technology device 48, maximising the function of the wearable technology device from a single charge. The wearable technology device 48 may comprise a protective, touch sensitive, transparent layer 49 that may have a form of haptic and/or tactile feedback on and/or incorporated into its design. The wearable technology device may further comprise protective and decorative casing 50 which may house the electronic and mechanical components of the wearable technology device 48. A connection 52 may be included for connecting a strap or any other type of fastening that may be required. The power cell 1 is housed within a power cell protective casing 53; the power cell protective casing 53 may also contain any other electronics that are needed for control of the system, human-to-device sensing, and/or device-to-device communication, including but not limited to charging.

A magnetic connector 51 may be included that may include an additional mechanism for locking the protective and decorative casing 50 and the power cell protective casing 53 together. The magnetic connector 51 may act as a means of fixing the two casings together and providing a means of transferring energy and data between the two sections of the wearable technology device 48.

The wearable technology device 48 may include a traditional watch movement 54 with hands, drive shafts, and other known components expected in a unit of this type, including a traditional watch mechanism drive unit and electronics 55. The wearable technology device 48 may further comprise an electronic display 56 with a hole in the centre to accommodate the traditional watch movement. The wearable technology device 48 may include electronics for smart watch functions 57, as is known in the art. The wearable technology device 48 may further comprise a replaceable primary power cell 58 for traditional watch movement, and an array of sensors and electronics 59. The separate replaceable primary power cell 58 and power cell 1 may provide an arrangement such that the time function will run independently from the smart watch functions of the wearable technology device, so that even if the smart watch functions power supply power cell 1 is depleted, the traditional time measurement system 54 can still operate as intended.

The electronic display 55 may provide the ability to display any one of many faces behind the hands of the traditional watch hands, including information that is not related to time measurement. If the more power consuming smart watch functions are not used, the wearable technology device 48 may continue to function as a watch for many months, giving said device an advantage over other such devices not offering this capability.

Figure 15:
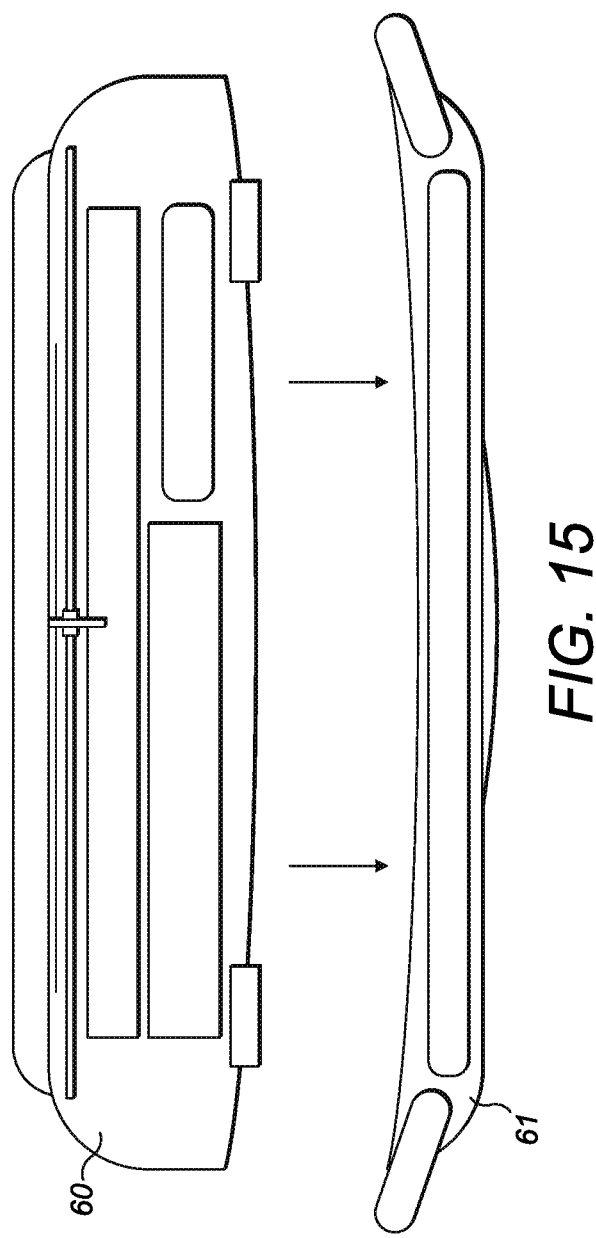
FIG. 15 shows a fourth embodiment of the power cell implemented in a wearable technology device.

FIG. 15 shows the wearable technology device as described with reference to FIG. 14, wherein the top section 60 of the wearable technology device is separate to the bottom section 61 of the wearable technology device. The top section 60 may contain the traditional watch 54, drive unit and electronics 55, electronic display 56, electronics for smart watch functions 57, replaceable primary power cell 58, and the array of sensors and electronics 59. The bottom section 61 may comprise the power cell 1 and a further array of sensors. As the top section 60 of the wearable technology device has its own primary power cell 58, it is possible to remove the top section 60 from the bottom section 61 containing the power cell 1 such that a fully charged power cell 1 can be attached to the wearable technology device 48, and the power cell 1 with depleted charge can be placed on a charging unit for rapid charging.

Many different top sections 60 may be used with many different bottom sections 61 such that the wearable technology device may be modular. This allows for replacement of the top section 60 when new upgrades are available, whilst maintaining the same bottom section 61. In other scenarios, a new bottom section 61, for example comprising a power cell 1 with increased capacity or a bottom section 61 with additional sensors, may become available allowing for a replacement of only the bottom section 61.

Alternative Embodiments

Alternative embodiments may be contemplated on reading the above disclosure, which may nevertheless fall within the scope of the invention as defined by the accompanying claims.

The invention claimed is:

1. A rechargeable power device, comprising:
a plurality of supercapacitors arranged in a substantially planar array such that physical gaps are present between each supercapacitor of the array of supercapacitors;
at least one rechargeable battery; and
control electronics arranged to couple the supercapacitors to the at least one rechargeable battery so as to charge the rechargeable battery, and to couple the supercapacitors to output management electronics so as to supply power to an external device.

2. The device of claim 1, wherein the supercapacitors operate as a rechargeable secondary cell.

3. The device of claim 1, wherein the supercapacitors comprise electrodes containing high surface area functional materials.

4. The device of claim 1, wherein the at least one rechargeable battery comprises an anode and cathode, each of the anode and cathode arranged on flexible, semi-flexible or rigid current collector substrates.

5. The device of claim 1, wherein the control electronics are arranged to direct charge from the at least one rechargeable battery to said output management electronics.

6. The device of claim 1, wherein the control electronics are arranged to supply power to the external device from either the supercapacitors, or the at least one rechargeable battery.

7. The device of claim 1, wherein the control electronics are arranged to:
rapidly charge the supercapacitors from an external power supply; and
charge more slowly, from the plurality of supercapacitors, the at least one rechargeable battery.

8. The device of claim 1, wherein the control electronics are arranged to:
rapidly charge the supercapacitors; and
simultaneously charge the at least one rechargeable battery;
wherein the supercapacitors and at least one rechargeable battery are charged from an external power supply.

9. A method of manufacturing a rechargeable power device, comprising:
forming one or more supercapacitors;
printing at least one rechargeable battery; and
forming control electronics arranged to couple the one or more supercapacitors to the at least one rechargeable battery; wherein:
printing the at least one rechargeable battery comprises printing at least one anode and at least one cathode on current collector substrates in an air environment; and
wherein the cathode is printed from a slurry comprising an aqueous binder system.

10. The method of claim 9, wherein the at least one rechargeable battery is printed using at least one of screen printing, ink-jet printing, flexographic printing, stencil printing, and rotogravure printing.

11. The method of claim 9, wherein the anode is printed from a slurry comprising an aqueous binder system and at least one of Ni, Zn, or Al.

12. The method of claim 9, wherein the slurry from which the cathode is printed further comprises at least one of $\alpha$-$MnO_2$, $\lambda$-$MnO_2$, $TiO_2$, todorokite, zinc-hexacyanoferrate, copper-hexacyanoferrate, spinel-$Mn_2O_4$, nickel-hexacyanoferrate, aerogels, $V_2O_5$, aerogels, graphite, graphene, carbon nanotubes, oxygen containing perovskite compounds, clays, and talc.

13. The method of claim 9, wherein the one or more supercapacitors are formed by printing.

14. The method of claim 13, wherein the one or more supercapacitors are printed using at least one of screen printing, ink-jet printing, flexographic printing, stencil printing and rotogravure printing.

15. The method of claim 13, wherein electrodes of the one or more supercapacitors are formed by blending high surface area functional materials with an aqueous binder system to form a slurry, and printing the slurry on metallic or non-metallic current collector substrates to form printed electrodes.

16. The method of claim 9, undertaken using roll-to-roll or batch manufacturing processes.

* * * * *